Figures 1, 2:
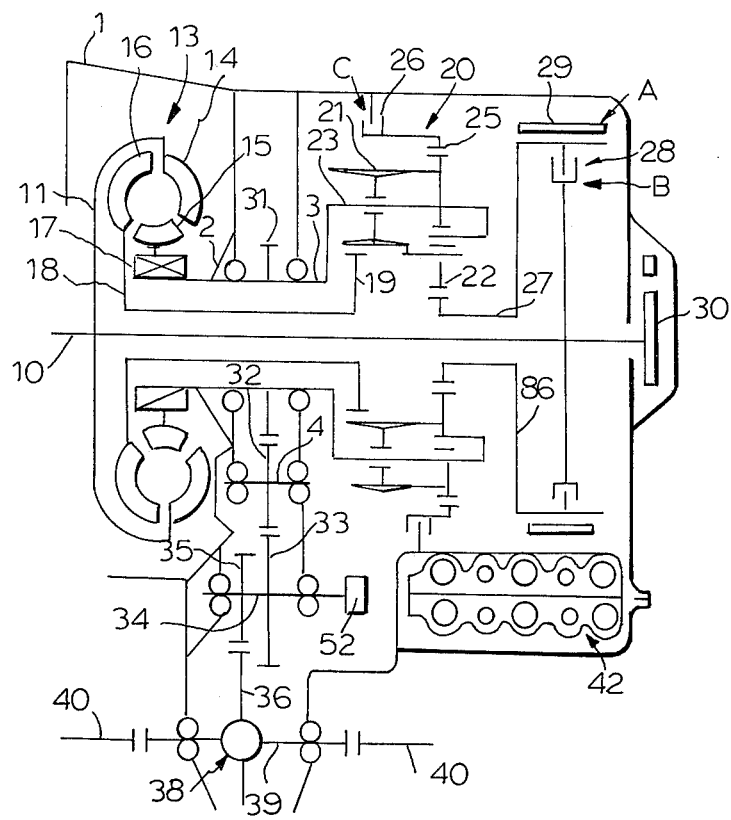
Figure 2B:
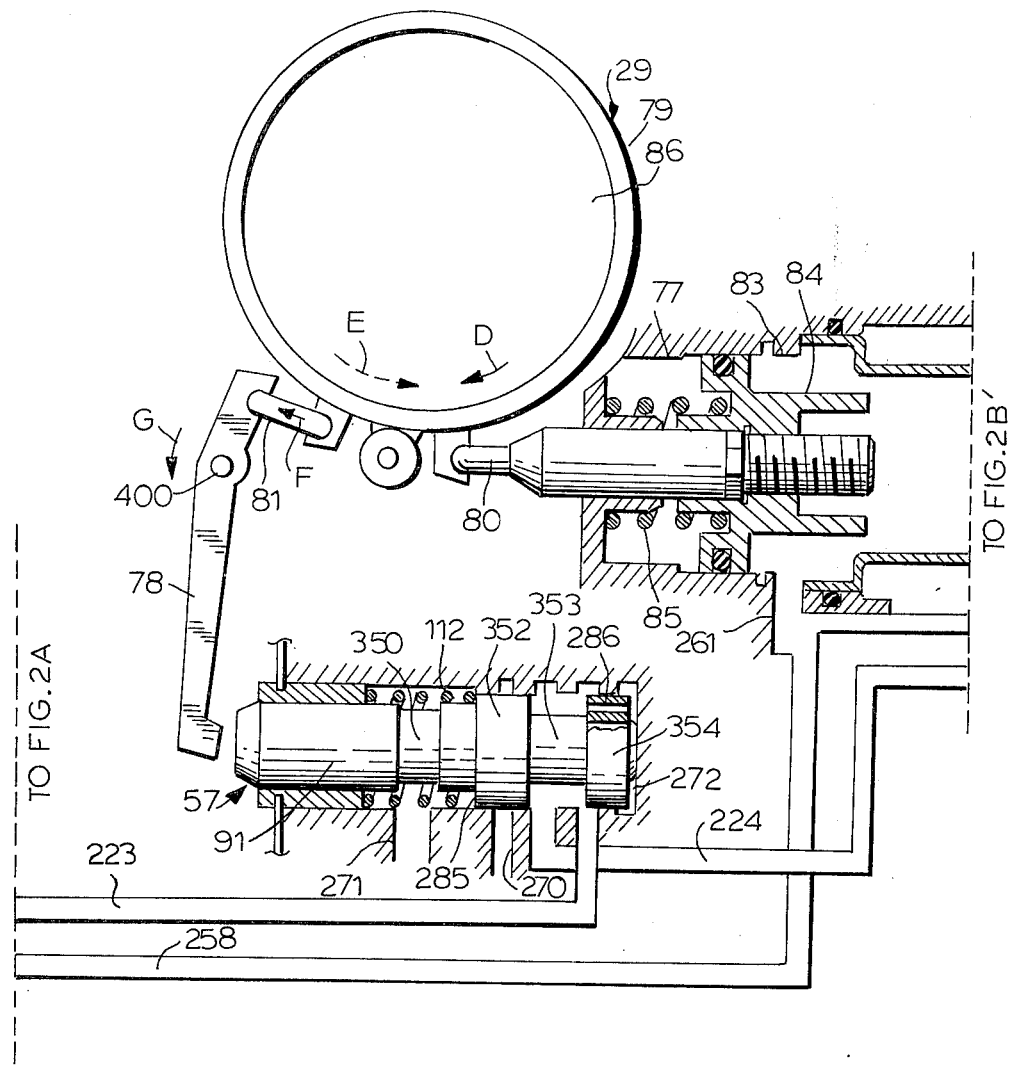
Figure 2B:
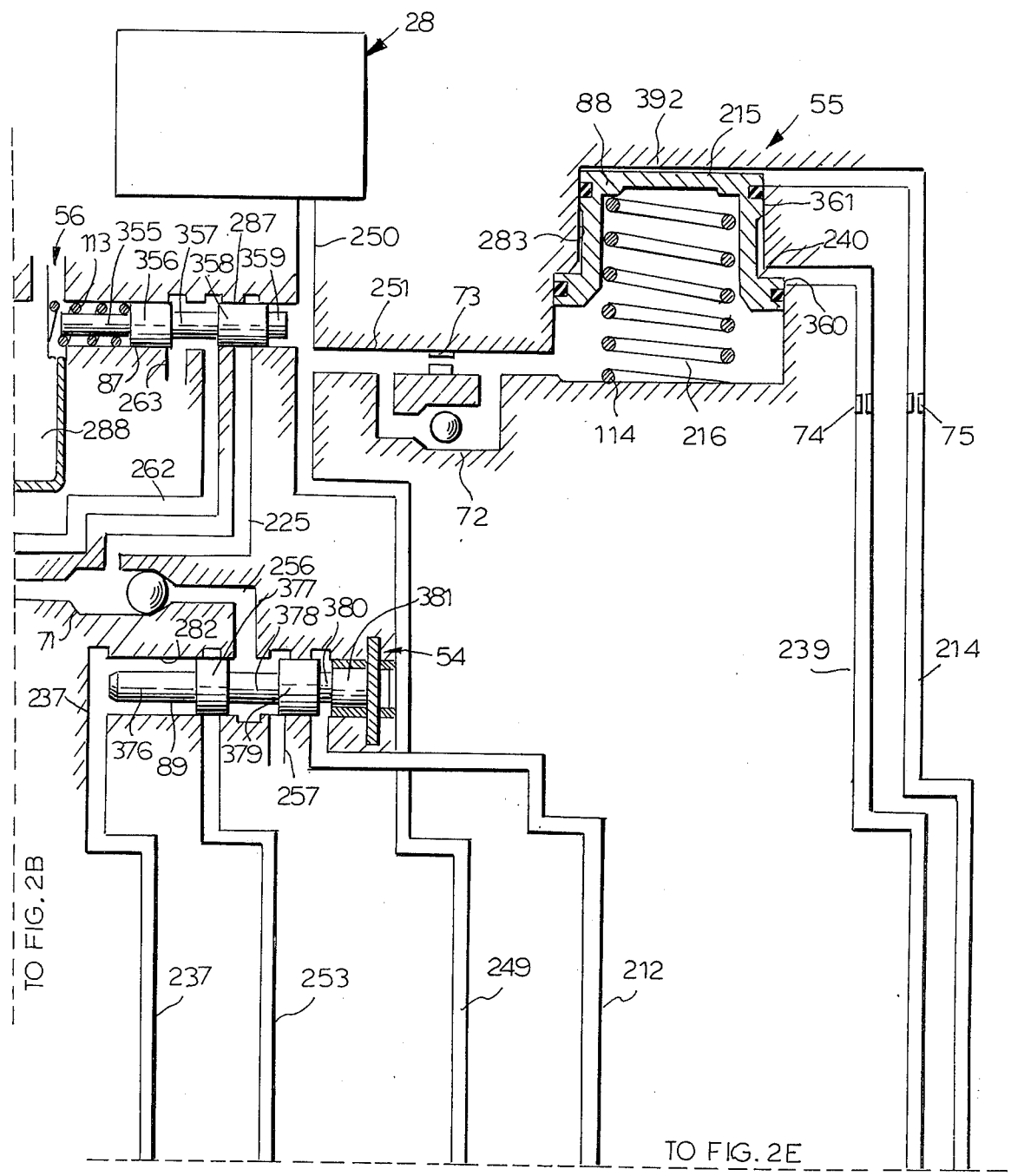
Figure 2C:
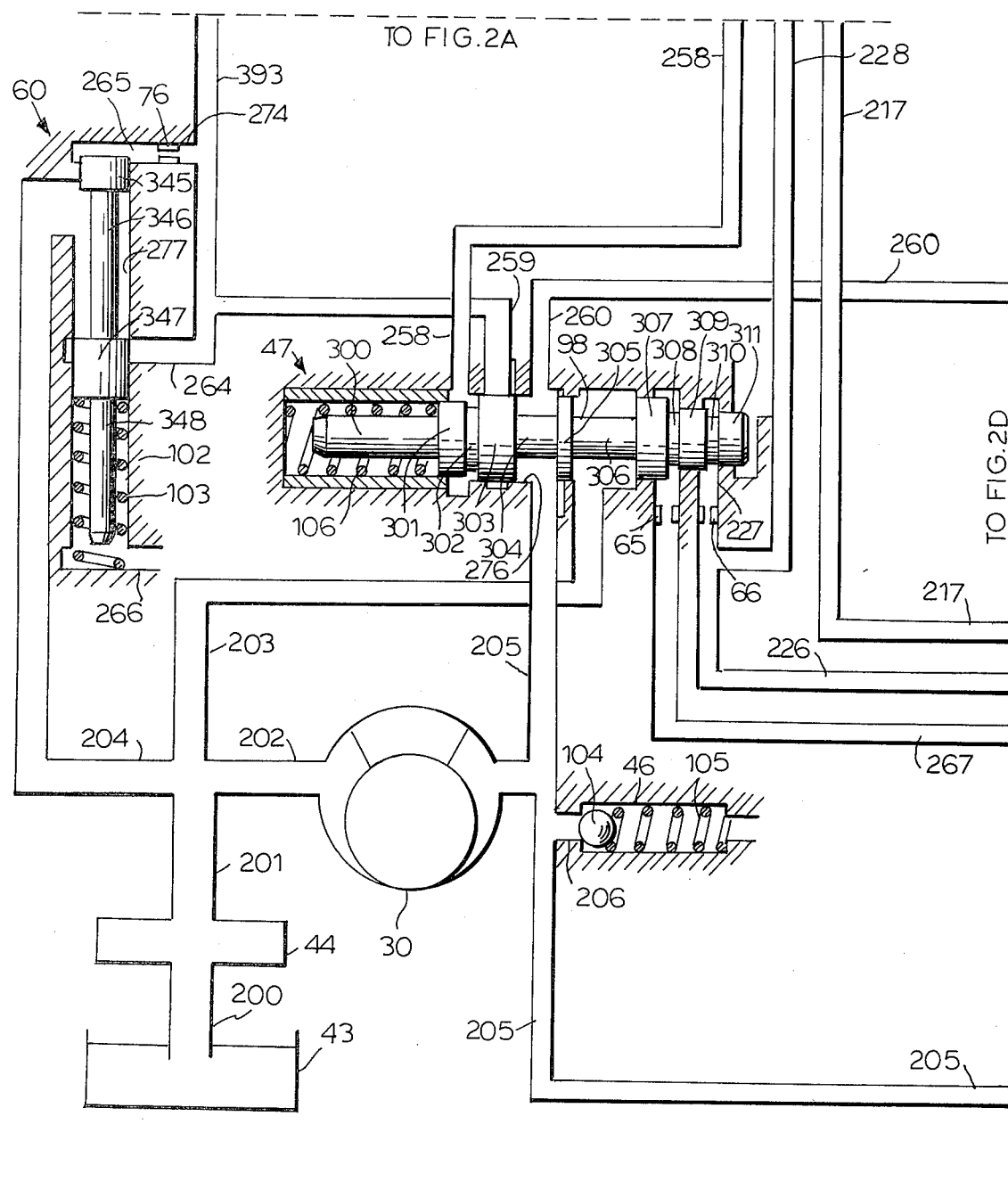
Figure 2D:
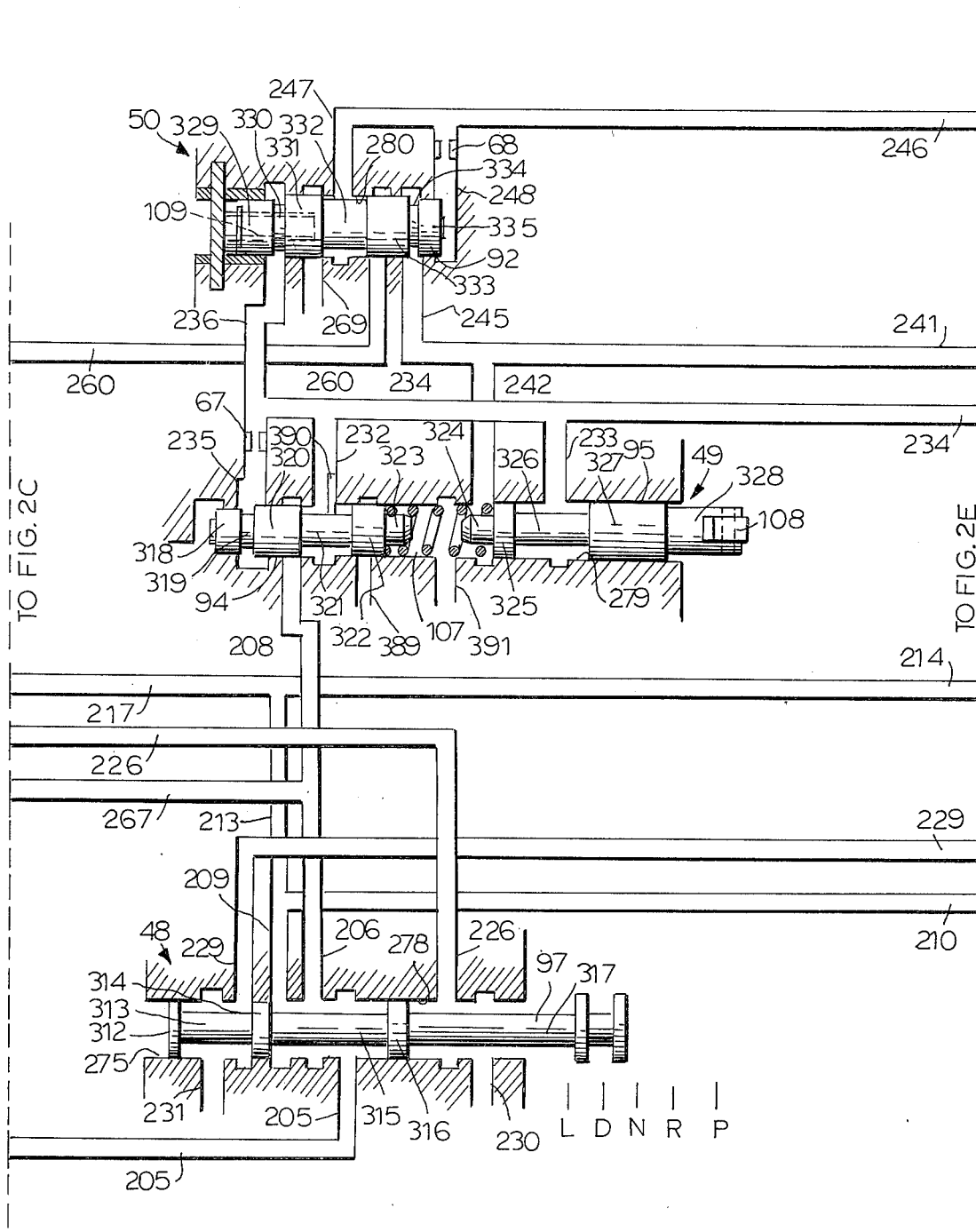
Figure 2E:
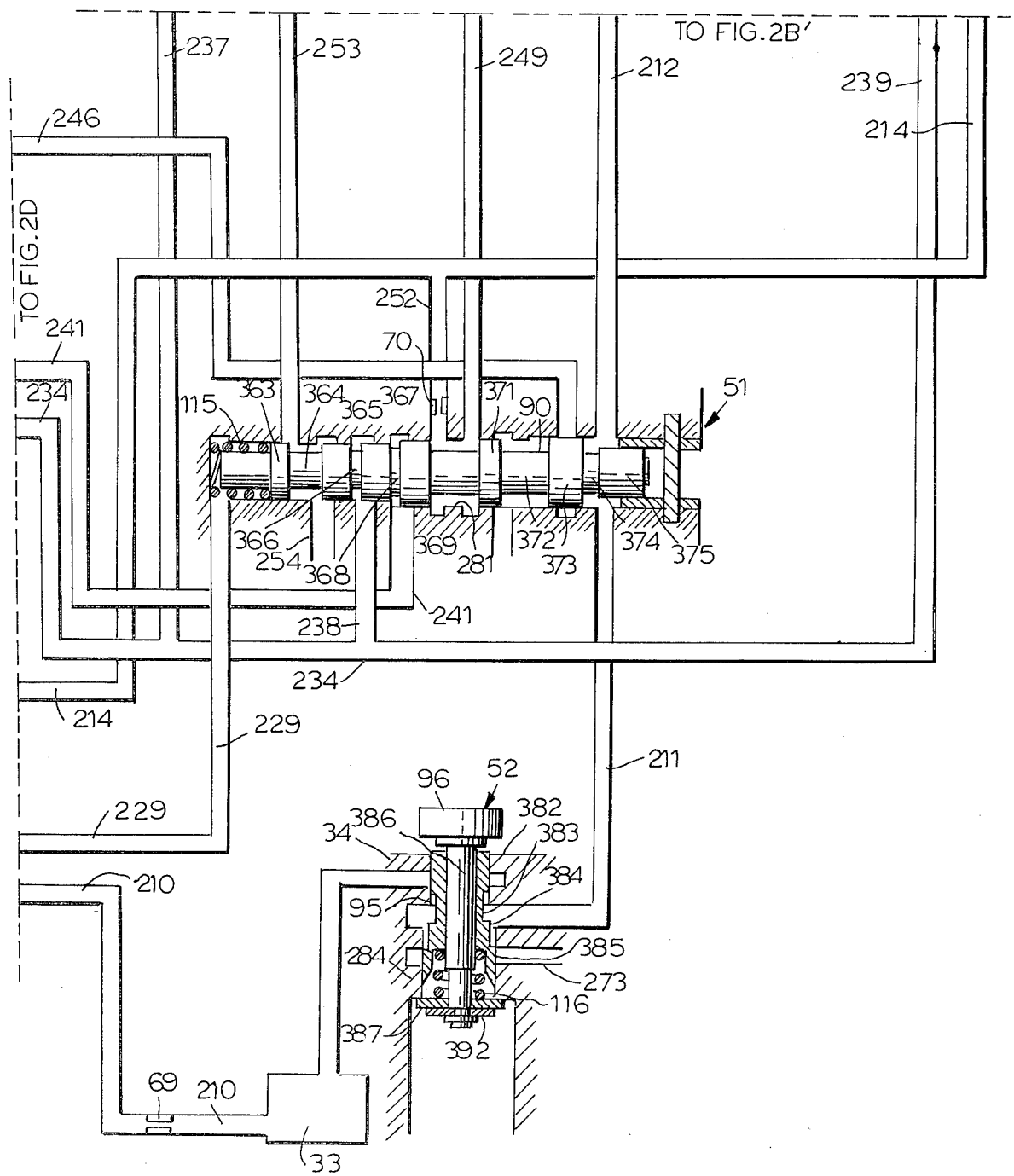

United States Patent [19]

Hiramatsu

[11] 4,125,038
[45] Nov. 14, 1978

[54] SPEED CHANGE GEAR IN A HYDRAULIC TYPE AUTOMATIC TRANSMISSION

[75] Inventor: Takeo Hiramatsu, Nagaokakyo, Japan

[73] Assignee: Mitsubishi Jukogyo Kabushiki Kaisha, Tokyo, Japan

[21] Appl. No.: 787,463

[22] Filed: Apr. 14, 1977

[30] Foreign Application Priority Data

Dec. 9, 1976 [JP] Japan .............................. 51-148501

[51] Int. Cl.² ............................................. B60K 41/18
[52] U.S. Cl. ....................................... 74/869; 74/865
[58] Field of Search .................. 74/867, 868, 869, 865

[56] References Cited

U.S. PATENT DOCUMENTS

| | | | |
|---|---|---|---|
| 3,442,152 | 5/1969 | Chana | 74/869 X |
| 3,650,160 | 3/1972 | Higuchi et al. | 74/868 X |
| 3,752,015 | 8/1973 | Murakami | 74/869 |
| 3,792,763 | 2/1974 | Enomoto | 74/869 X |
| 3,938,410 | 2/1976 | Dach et al. | 74/869 |
| 4,006,652 | 2/1977 | Murakami | 74/869 |
| 4,046,033 | 9/1977 | Hashimoto et al. | 74/869 |

Primary Examiner—Samuel Scott
Assistant Examiner—Lance W. Chandler

[57] ABSTRACT

Improvement in a hydraulic type automatic transmission including a fluid torque converter and a plurality of friction-engagement devices associated with hydraulic servo devices in which different speed change ratios including a plurality of forward movement steps can be realized by selectively actuating the friction-engagement devices with a hydraulic pressure either automatically or manually. Upon deceleration from a higher speed gear ratio to a predetermined gear ratio, a friction-engagement device for realizing the predetermined gear ratio is quickly engaged without delay, whereas upon acceleration from a lower speed gear ratio or a neutral condition to the predetermined gear ratio, engagement of the friction engagement device is effected slowly by actuating an accumulator and a flow rate limiter and thereby generation of an excessive shock is prevented.

6 Claims, 15 Drawing Figures

| FIG.2A | FIG.2B | FIG.2B' |
| --- | --- | --- |
| FIG.2C | FIG.2D | FIG.2E |

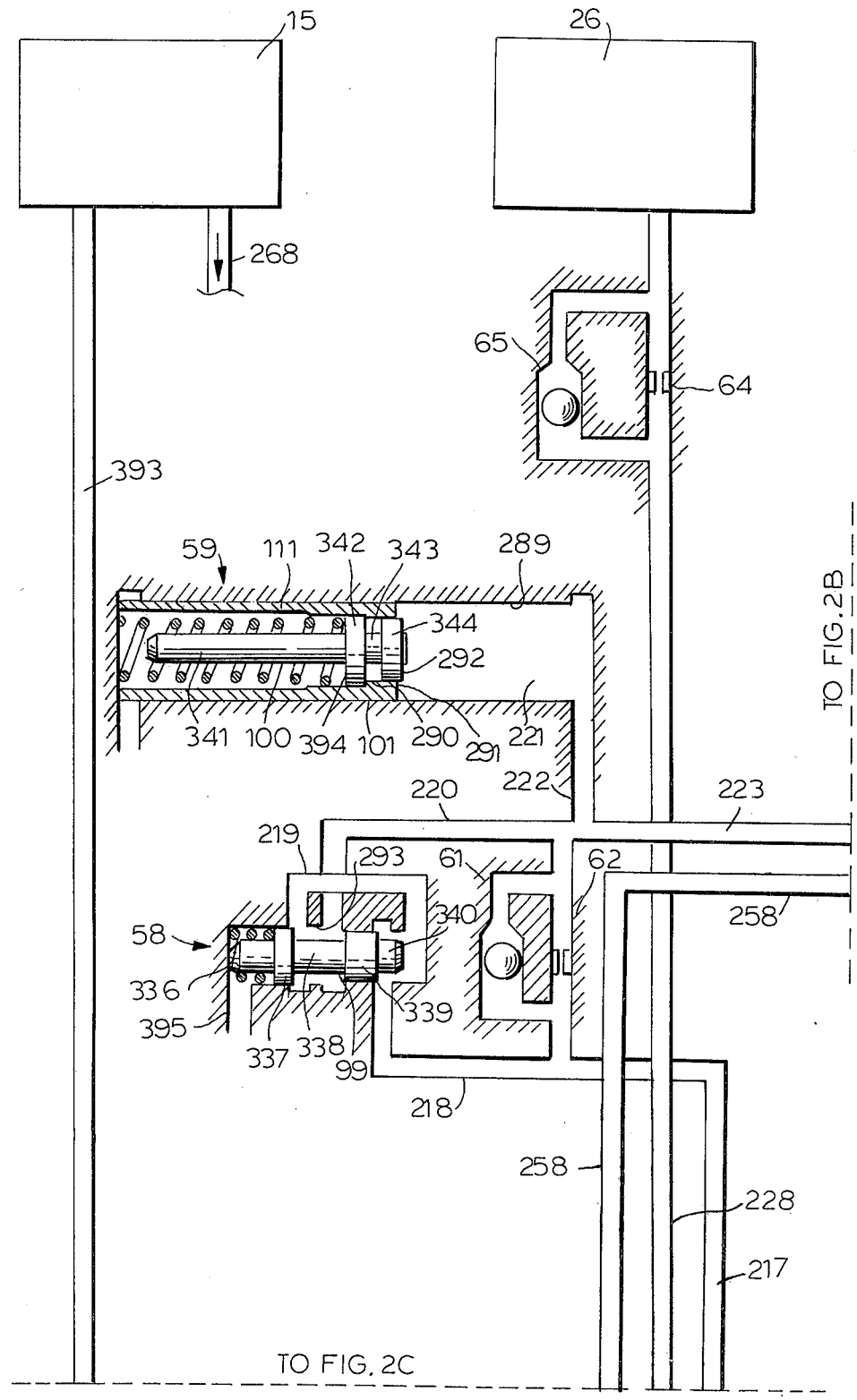

SPEED CHANGE GEAR IN A HYDRAULIC TYPE AUTOMATIC TRANSMISSION

The present invention relates to improvements in a hydraulic type automatic transmission, especially suitable for use in an automobile.

In general, a hydraulic type automatic transmission consists of a torque converter and a speed change gear, and in this speed change gear are provided a plurality of friction-engagement devices such as a clutch, a brake, etc. as required by the respective speed change steps. By appropriately actuating said plurality of friction-engagement devices in accordance with a driving condition, a running speed is automatically switched, and the actuating forces for these friction-engagement devices are obtained by feeding pressurized oil to hydraulic servo devices provided in these friction-engagement devices.

In heretofore known automatic transmissions for use in an automobile, it has been a common practice to regulate a hydraulic pressure fed to the respective hydraulic servo devices in the friction-engagement devices of the automatic transmission (hereinafter called line pressure Pl) as correlated to a car speed and a throttle opening angle. Then, it has been also a common practice that when a throttle opening angle is large even if a car speed is low, a transmission torque is large, and so the line pressure fed to the hydraulic servo devices is selected high, whereas when a car speed is high or a throttle opening angle is small, a transmission torque is small, and so the line pressure is selected low.

This is because if the hydraulic pressure is unnecessarily high upon speed change, a shock resulted from the speed change is large and also a power loss of a hydraulic pump is increased disadvantageously. In order to mitigate the speed change shock upon the above-mentioned speed change, it is necessary to ideally control timing for feeding a hydraulic pressure to a hydraulic servo device or exhausting pressurized oil from said device and a variation rate of a hydraulic pressure acting upon the hydraulic servo device.

A band brake device that is less expensive and simple in structure for ideally controlling said hydraulic pressure timing and said hydraulic pressure variation rate upon speed change, has been already proposed by the applicant of this application (Japanese Pat. No. 706,004). This band brake device has such construction that a band brake is associated to a rotary member in a transmission mechanism between a driving rotary shaft and a driven rotary shaft, a hydraulic pressure adapted to a reaction torque generated upon frictional fixing of the band brake device is fed to a hydraulic servo device for engaging the bank brake device, and thereby a hydraulic pressure being fed is enhanced as the reaction torque borne by the band brake device is increased in one direction until the frictional fixing is completed, while in the opposite direction only such degree of low hydraulic pressure as making the frictional fixing impossible can be fed, and thus mitigation of the shock upon speed change is achieved by making the engagement in the band brake device to be effected only in a predetermined direction as is the case with a one-way clutch.

In case of an automatic transmission constructed in such manner that when the band brake is actuated to fix a rotary member a first speed is realized and when speed change is effected to a second speed the above-mentioned fixing is released, upon speed change from the second speed to the first speed the aforementioned one-way clutch action of the band brake device is effected, and thereby friction-engagement of the band brake can be effected in good timing without generating a speed change shock, whereas when the first speed is realized starting from a neutral condition where an acceleration pedal is trampled down and the aforementioned rotary member is rotating at a high speed, the one-way clutch action adversely causes rapid increase of the engagement torque which generates a shock, resulting in disadvantages such that a shaft in a power transmission system may be damaged.

More particularly, upon speed change from the second speed to the first speed, the aforementioned rotary member is gradually stopped in rotation starting from a rotating condition in the inoperable direction of the band brake device and thereafter it gradually transfers from the stopped condition to a rotating state in the operable direction of the band brake device, so that a speed change shock would not be generated, whereas when the first speed is realized starting from the above-mentioned neutral condition, since the rotary member is rotating at a high speed in the operable direction of the brake band device, the reaction torque of the brake band device is rapidly increased as a hydraulic pressure is fed to the hydraulic servo device, so that the feed of the hydraulic pressure to the hydraulic servo device is also increased abruptly, and thereby perfect fixing of the rotary member is effected quickly, resulting in generation of a shock.

It is a principal object of the present invention to provide a speed change gear in a hydraulic type automatic transmission, in which upon deceleration from a higher speed gear ratio to a predetermined gear ratio, a friction-engagement device for realizing the predetermined gear ratio is quickly engaged without delay of engagement, whereas upon acceleration from a lower speed gear ratio or a neutral condition to the predetermined gear ratio, engagement of the friction engagement device is effected slowly by actuating an accumulator and a flow rate limiter and thereby generation of an excessive shock is prevented.

Another object of the present invention is to provide a speed change gear in a hydraulic type automatic transmission, in which a hydraulic pressure to be fed to a hydraulic servo device for actuating a friction-engagement device is fed so as to have a build-up that is most suitable for respective speed change conditions.

Still another object of the present invention is to provide a speed change gear in a hydraulic type automatic transmission, in which generation of an excessive shock upon realization of a first forward speed gear ratio starting from a neutral condition can be prevented, and thereby damages of shafts caused by overloading can be prevented.

The above-mentioned various objects are achieved by a speed change gear in a hydraulic type automatic transmission including a fluid torque converter and a plurality of friction-engagement devices associated with hydraulic servo devices, in which different speed change ratios including a plurality of forward movement steps can be realized by selectively actuating said friction-engagement devices with a hydraulic pressure either automatically or manually, characterized in that said speed change gear comprises a first friction-engagement device for realizing a predetermined gear ratio, a second friction-engagement device for realizing a higher speed gear ratio than said predetermined gear ratio, a hydraulic pressure source, a hydraulic pressure regulating valve for controlling a line pressure generated by said hydraulic pressure source, a first hydraulic servo device for engaging said first friction-engagement device, a second hydraulic servo device for engaging said second friction-engagement device, a first hydraulic path for feeding a hydraulic pressure regulated by said hydraulic pressure regulating valve to said first hydraulic servo device, a second hydraulic path for feeding said regulated hydraulic pressure to said second hydraulic servo device, a switching valve interposed in the midway of said first and second hydraulic paths for selectively switching the hydraulic pressure feed to said first and second hydraulic servo devices, a control valve disposed in the midway of said first and second hydraulic paths for controlling switching between the state of feeding a hydraulic pressure to said respective hydraulic paths and the state of exhausting pressurized oil fed to the respective hydraulic paths, a flow rate limiter and a gate valve interposed in parallel in the midway of said first hydraulic path between said switching valve and said control valve, and an accumulator disposed in said first hydraulic path between said switching valve and said flow rate limiter and gate valve, said gate valve being adapted to be opened to communicate a hydraulic path for by-passing said flow rate limiter when the hydraulic pressure fed to said first hydraulic servo device exceeds a predetermined value.

Figure 3:
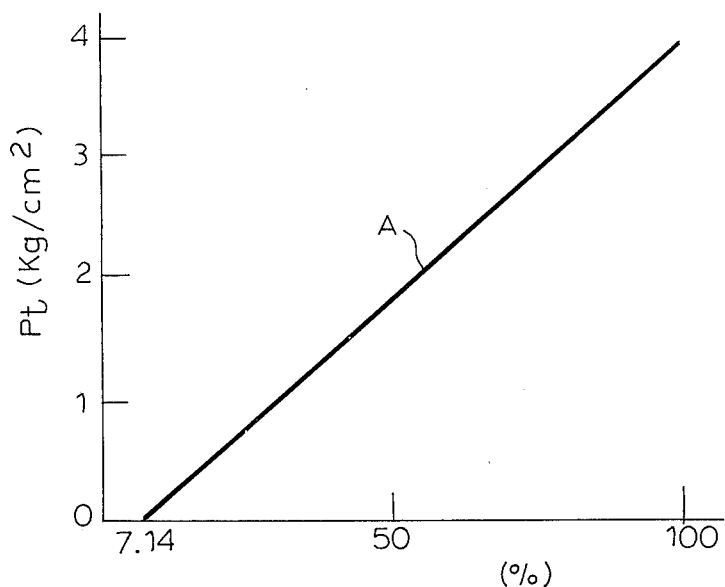
Figure 4:
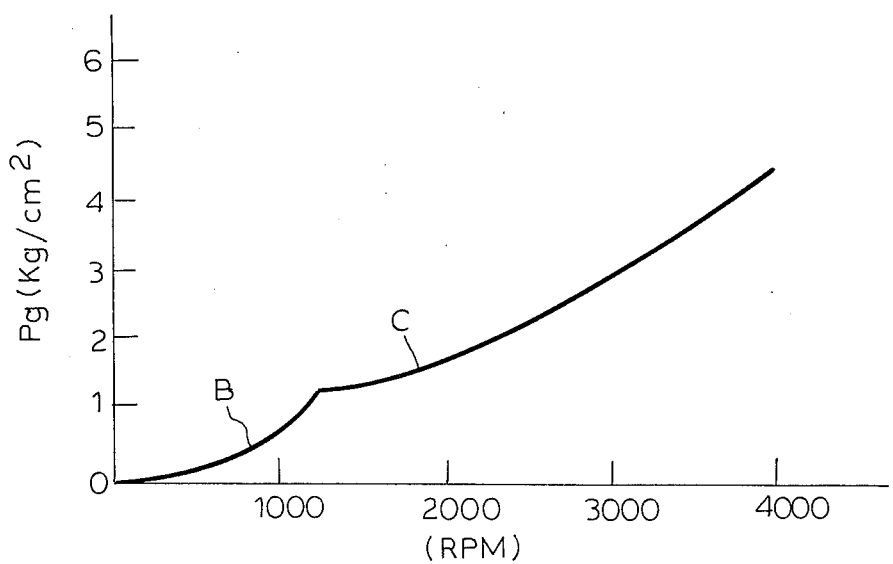
Figure 5:
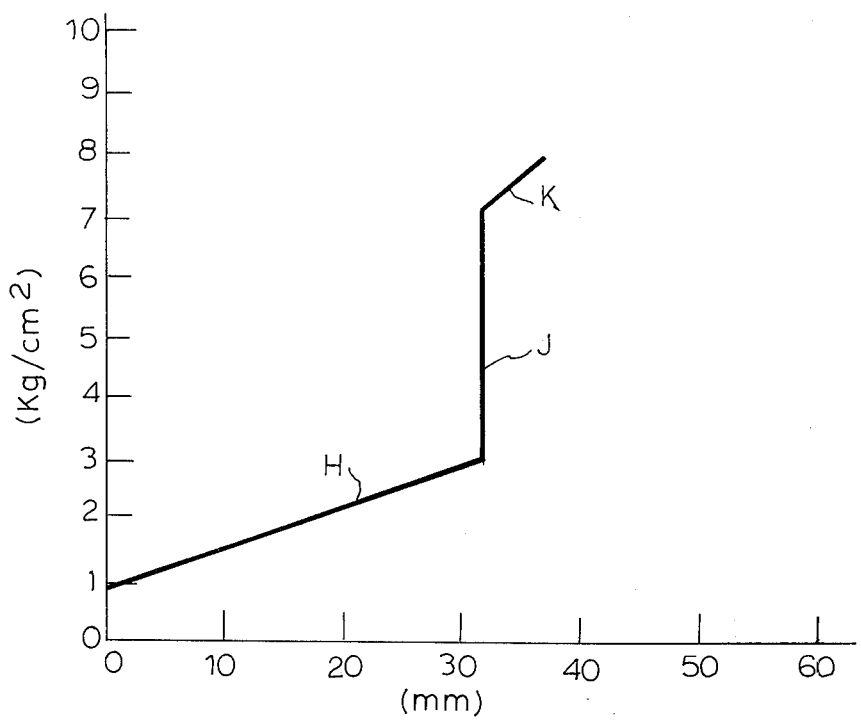
Figure 6:
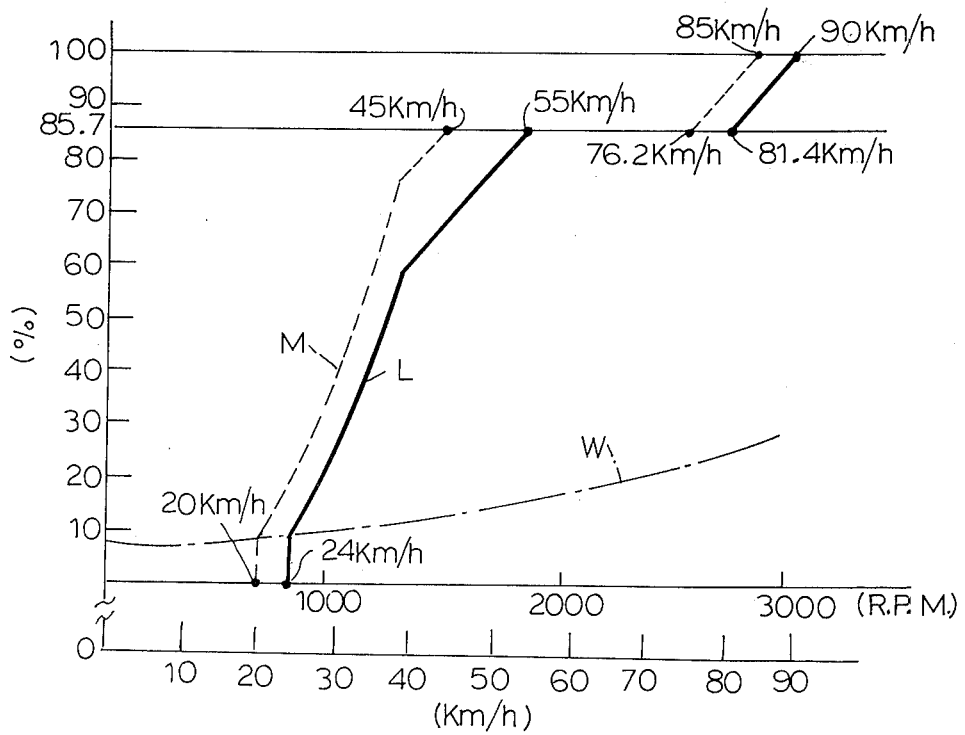
Figure 7:
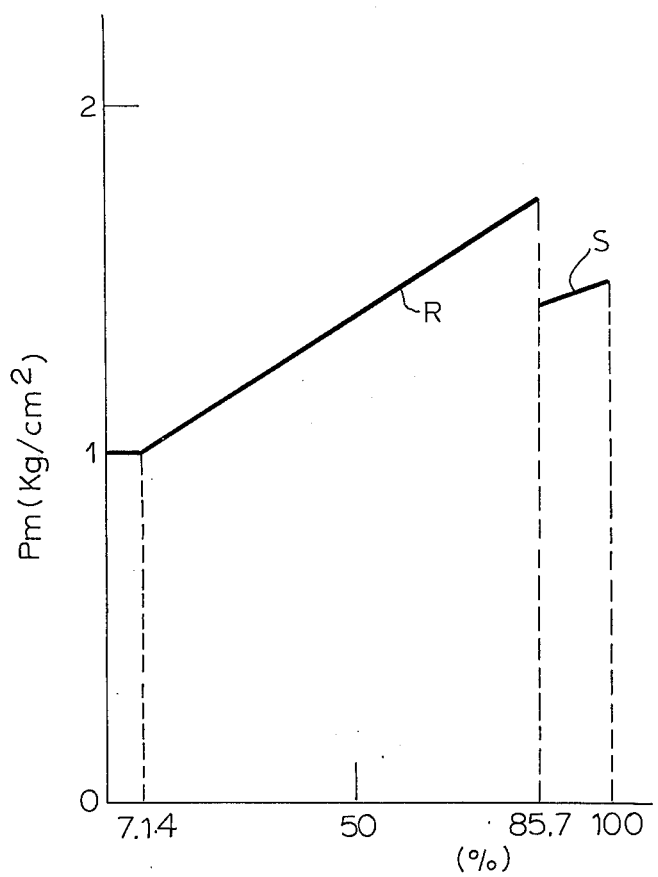

Above-mentioned and other features and objects of this invention will become more apparent by reference to the following description taken in conjunction with the accompanying drawings, in which:

FIG. 1 is a longitudinal cross-section view showing a construction of a speed change gear according to one preferred embodiment of the present invention, FIG. 2 shows the mode of joining FIGS. 2A, 2B, 2C, 2D and 2E, which jointly illustrate details of a hydraulic control circuit for a completed speed change gear according to the preferred embodiment shown in FIG. 1, FIG. 3 is a diagram showing characteristics of a throttle pressure $P_t$ to be used in the preferred embodiment shown in FIGS. 1 and 2, FIG. 4 is a diagram showing characteristics of a governor pressure $P_g$ regulated by a governor valve to be used in the same preferred embodiment, FIG. 5 is a diagram showing characteristics of an accumulator pressure generated by an N-D accumulator to be used in the same preferred embodiment, FIG. 6 is a diagram showing a shift pattern and an engine brake operating region in the same preferred embodiment, and FIG. 7 is a diagram showing characteristics of a modulator pressure $P_m$ regulated by a hysteresis control valve to be used in the same preferred embodiment.

Now description will be made on one preferred embodiment of the present invention as applied to a hydraulic type automatic transmission for automobiles having two forward steps and one backward step, with reference to the accompanying drawings.

A construction of a speed change gear according to the present invention is shown in longitudinal cross-section in FIG. 1, in which a drive shaft 10 to which a drive power is transmitted from an engine not shown is connected to a pump 14 of a torque converter via a casing 11 and also connected to a clutch device 28, so that the drive power is transmitted to a differential gear 38 through only the torque converter 13 upon a first speed and a backward movement, but is transmitted to the differential gear 38 through both the torque converter 13 and the clutch device 28 upon a second speed. In other words, upon a second speed a power split system is employed, and in the illustrated embodiment, 58% of the total power is transmitted through the torque converter 13 and the remaining 42% of the power is transmitted through the clutch device 28.

On a drive shaft 10 are coaxially arranged the torque converter 13, a drive gear 31, a Lavignon type planet gear device 20, a backward movement brake device 26, a second speed clutch device 28 and a first speed band brake device 29 in sequence from the side of the engine towards the opposite side. A turbine 16 of the torque converter 13 is connected to a front sun gear 19 in the planet gear device 20 via a sleeve shaft 18, while a stator 15 thereof is connected via a one-way clutch 17 to a sleeve shaft 2 that is fixedly secured to a transmission casing 1. The planet gear device 20 consists of a front sun gear 19, a rear sun gear 24, a long pinion 21, a short pinion 22, a ring gear 25 and a planet gear support 23. The front sun gear 19 meshes with the long pinion 21, the long pinion 21 meshes with the short pinion 22, and the short pinion 22 meshes with the rear sun gear 24 and the ring gear 25. The planet gear support 23 is connected to the drive gear 31 via a sleeve shaft 3, the ring gear 25 is coupled to a brake device 26, and the rear sun gear 24 is coupled via a sleeve shaft 27 to the clutch device 28 and the brake device 29. In parallel to the drive shaft 10 are disposed idler shafts 4 and 34 and an output shaft 39 of the differential gear 38, the drive gear 31 meshes with an intermediate gear 32 fixedly secured to the idler shaft 4, the intermediate gear 32 meshes with another intermediate gear 33 fixedly secured to the idler shaft 34, and another gear 35 that is fixedly secured to the idler shaft 34 meshes with an input gear 36 of the differential gear device 38.

When the clutch device 28 and the backward movement brake device 26 are in a disengaged state, if the rear sun gear 24 is fixed to the casing 1 by actuating the first speed brake device 29, then the driving force from the drive shaft 10 is transmitted to the torque converter 13, sleeve shaft 18 and front sun gear 19, resulting in forward rotation of the planet gear support 23 at a speed reduction ratio of XI, which is transmitted to the drive gear 31 via the sleeve shaft 3. In the illustrated embodiment, the above-referred speed reduction ratio is preset at XI = 1.73.

When the clutch device 28 and the first speed brake device 29 are in a disengaged state, if the ring gear 25 is fixed to the casing by actuating the backward movement brake device 29, then the driving force transmitted to the front sun gear 19 acts upon the planet gear support 23 as a reverse rotational force, and in the case of the illustrated embodiment, this reverse rotational force is transmitted to the drive gear 31 via the sleeve shaft 3 at a speed reduction ratio of 1.73.

On the other hand, when the second speed clutch device 28 is engaged and both the first speed brake device 29 and the backward movement brake device 26 were kept in a disengaged state to integrally joint the drive shaft 10 and the rear sun gear 24, a part of the driving force is transmitted from the shaft 10 to the rear sun gear via the clutch device 28 and the sleeve shaft 27, and the remaining part thereof is transmitted to the front sun gear 19 through the torque converter 13, this sharing ratio for the driving force being given as a diameter ratio between the front sun gear 19 and the rear sun gear 24, in the illustrated embodiment the ratio is preset at diameter D1 of front sun gear: diameter D2 of rear sun gear = 58:42 so that the torque sharing proportion is 42% for the directly coupled part, the driving force is also transmitted to the both sun gears 19 and 24 drives the planet gear support 23 in the forward rotation at a speed ratio of 1.00 and the rotation is transmitted to the drive gear 31. The driving force transmitted to the drive gear 31 is further transmitted through the intermediate gears 32 and 33, the idler shaft 34 and the gear 35 to the differential gear 38, and then transmitted from the output shaft 39 to axles 40.

Reference numeral 42 designates a valve body provided for the purpose of hydraulically controlling engagement and disengagement of the above-referred brakes 26 and 29 and clutch 28, and in this valve body 42 are contained hydraulic circuits and hydraulic valves as described later. Reference numeral 30 designates an oil pump provided at one end of the drive shaft 10, which feeds a pressurized oil to the valve body 42, the torque converter 13 and the respective lubricating sections in the device according to the present invention. Reference numeral 52 designates a governor valve mounted on the intermediate shaft 34, which feeds a hydraulic pressure corresponding to the rotational speed of the intermediate shaft 34 and thus corresponding to the car speed to the above-described hydraulic circuit.

Now the hydraulic control circuit in the speed change gear shown in FIG. 1 will be described in more detail with reference to FIG. 2 which consists of FIGS. 2A, 2B, 2C, 2D and 2E jointed together. It is to be noted that in FIG. 2 the hydraulic control circuit is shown in a second speed state where a manual valve is placed at a D-range position and a throttle opening angle is 50%, and that in FIG. 2 the first speed brake device 29 is shown as viewed from the front side of the automatic transmission, that is, from the side of the torque converter 13.

In the hydraulic control circuit are contained a large number of valves such as a line pressure relief valve 46, a pressure regulating valve 47, a manual valve 48, a throttle valve 49, a hysteresis control valve 50, a first-second speed shift valve 51, a governor valve 52, an engine brake discrimination valve 54, a first-second speed timing valve 56, a first speed pressure regulating valve 57, an N-D control valve 58, a torque converter control valve 60 and check valves 61, 63, 71, 72, etc., and a second speed accumulator 55, and N-D accumulator 59 and further a large number or orifices 62, 64, 65, 66, 67, 68, 69, 70, 73, 74, 75 and 76.

Working oil passed through a hydraulic path 200 from an oil pan 4 for storing the oil has fine dust removed by an oil filter 44, then flows into an oil pump 30 through hydraulic paths 201 and 202, and after pressurized, it is led to the pressure regulating valve 47 and the manual valve 48 through a hydraulic path 205. In the pressure regulating valve 47, a spool 98 is slidably fitted in a cylindrical bore 276 drilled in the valve body 42, and the spool 98 is urged rightwardly as viewed in FIG. 2 by a spring 106. In the cylindrical bore 276 are opened hydraulic paths 205, 203, 258, 259, 260, 267, and 227. In FIG. 2 is shown the spool 98 as positioned at the rightmost end. On the spool 98 are formed lands 301, 303, 305, 307, 309 and 311 and annular grooves 300, 302, 304, 306, 308 and 310. When a hydraulic pressure is fed to the annular groove 308, due to the difference in a pressure receiving area between the lands 307 and 309, the spool 98 is urged leftwardly by said hydraulic pressure, and when a hydraulic pressure is fed to the annular groove 310, due to the difference in a pressure receiving area between the lands 309 and 310, the spool 98 is also urged leftwardly by the same hydraulic pressure. Furthermore, when a hydraulic pressure is fed to the annular groove 302, due to the difference in a pressure receiving area between the lands 301 and 303, the spool 98 is urged rightwardly by the same hydraulic pressure, and after all, the spool 98 stops at the position where the rightward urging force by the spring 106 and the above-mentioned urging forces caused by the respective hydraulic pressures are balanced. This pressure regulating valve 47 serves to regulate the hydraulic pressure in the hydraulic path 205 by exhausting the pressurized oil in the hydraulic path 205 into a hydraulic path 259 or a return hydraulic path 203 in accordance with the position of the spool 98.

A line pressure relief valve 46 is provided to prevent the hydraulic pressure in the hydraulic path 205 from extraordinarily rising when the pressure regulating valve 47 or the like has stuck from any reason. In this pressure relief valve 46, a branch path 206 of the hydraulic path 205 is closed by a ball 104 that is urged by a spring 105, and according to the illustrated embodiment, adjustment is made such that when the hydraulic pressure in the hydraulic path 205 exceeds 20 kg/cm$^2$ the ball 104 may open the branch path 206 to exhaust the oil.

The pressurized oil exhausted from the pressure regulating valve 47 to the hydraulic path 259 is fed to the torque converter 13 through a hydraulic path 393, and this hydraulic pressure fed to the torque converter 13 is regulated by the torque converter control valve 60. This control valve 60 consists of a spool 102 slidably fitted in a cylindrical bore 277 drilled in the valve body 42 and a spring 103 adapted to urge the spool 102 upwardly as viewed in FIG. 2. In the aforementioned cylindrical bore 277 are opened hydraulic paths 204, 264 and 274, and on the spool 102 are formed lands 345 and 347 and annular grooves 346 and 348. An end chamber 265 of the land 345 is communicated with the hydraulic path 393 through a hydraulic path 274, so that the spool 102 stops at the position where the hydraulic force exerted upon the end surface of the land 345 and the urging force of the spring 103 are balanced. When the hydraulic pressure in the hydraulic path 393 exceeds 4 kg/cm$^2$, the spool 102 is displaced downwardly to such extent that the hydraulic path 264 may be communicated with the return hydraulic path 204, so that the pressurized oil in the hydraulic path 393 is exhausted into the hydraulic path 204, and thereby the hydraulic pressure in the hydraulic path 393 is lowered to and maintained at 4 kg/cm$^2$. Then, the oil exhausted to the return hydraulic path 204 is again led to the oil pump 30. In addition, an orifice 76 is interposed in the hydraulic path 274 for the purpose of preventing the spool 102 from oscillating. The oil flowing into the torque converter 13 is subsequently exhausted through a hydraulic path 268, and is led to an oil cooler not shown and necessary lubricating sections in the illustrated device.

A manual valve 48 is operated by a driver for selecting various driving conditions, and it comprises a spool 97 slidably fitted in a cylindrical bore 278 drilled in the valve body 42. In the aforementioned cylindrical bore are opened hydraulic paths 205, 206, 209, 229 and 226, oil exhaust ports 230 and 231, and an opening port 275. The above-mentioned spool 97 is shifted by operating a lever provided in a cab (not shown) to select one of five driving conditions L, D, N, R and P. It is to be noted that L represents a first speed fixed driving condition, D represents a first and second speed automatic change driving condition, N represents a neutral condition, R represents a reverse driving condition and P represents a parking condition.

On the spool 97 are formed lands 312, 314 and 316 and annular grooves 313, 315 and 317. When the lever is operated so as to select the condition P, the hydraulic path 205 is communicated with the annular groove 313, which is in turn communicated with the hydraulic path 206, and further, since the gap space between the outer peripheral surface of the land 312 and the inner peripheral surface of the cylindrical bore 278 is selected large, the annular groove 313 is also communicated through the gap space with the oil exhaust port 231 and the opening port 275 at the left end of the cylindrical bore. In the cylindrical bore 278 are also opened hydraulic paths 209, 226 and 229 and an oil exhaust port 230, and in this case, the hydraulic paths 209 and 229 are communicated with the oil exhaust port 231, while the hydraulic path 226 and 230 are blocked from the hydraulic path 205 by the land 314. Accordingly, most of the pressurized oil fed from the hydraulic path 205 to the annular groove 313 is passed through the gap space around the land 312, exhausted through the oil exhaust port 231 or the opening port 275 at the left end, and then returned to the oil pan 43. If unloaded acceleration is effected by trampling an acceleration pedal not shown and thus the rotational speed of the engine is increased, then the flow rate in the hydraulic path 205 is increased, so that the hydraulic pressure in the hydraulic path 205 and the annular groove 313 is increased by the hydraulic resistance around the land 312, and thus the hydraulic pressure in the hydraulic path 206 is also increased. Since the hydraulic path 206 is communicated with the annular groove 308 of the pressure regulating valve 47 through the hydraulic path 267 and the orifice 65, the hydraulic pressure within the annular groove 308 is also increased, so that the spool 98 is urged and displaced slightly from the illustrated position to the left, then due to the leftward displacement of the land 303, the hydraulic path 205 is communicated to the hydraulic path 259 through the annular groove 304, and thereby the hydraulic pressure in the hydraulic path 205 is lowered.

Nextly, if the driving condition R is selected by operating the lever, then the hydraulic path 205 is communicated only with the hydraulic path 226 through the annular groove 315. The hydraulic path 226 is communicated with the annular groove 310 of the pressure regulating valve 47 via the orifice 66 and the branch path 227, and also communicated through a hydraulic path 228 with a hydraulic servo device for the backward movement brake device 26 which has a well-known structure and is not shown in the drawings. Accordingly, due to the hydraulic pressure fed to the annular groove 310, the spool 98 is urged leftwardly and the regulated pressure in the hydraulic path 205 is preset, in the illustrated embodiment, at 15 kg/cm². It is to be noted that the orifice 66 interposed in the hydraulic path 227 serves to prevent the spool 98 from oscillating.

On the other hand, when a hydraulic pressure is fed to the hydraulic servo device for the backward movement brake device 26, a backward speed is realized, and since a parallel connection of the orifice 64 and the check valve 63 is interposed in the hydraulic path 228 and the check valve 63 is constructed so as to block a hydraulic flow towards the hydraulic servo device, the feed of the pressurized air is effected gradually to mitigate a shock. If the R-range is released resulting in communication between the hydraulic path 226 and the oil exhaust port 230 through the annular groove 317 or 315, then the pressurized oil fed to the hydraulic servo device for the brake device 26 is exhausted. At this moment, the exhaust is effected quickly because the check valve 63 is opened, and therefore, even if the driving condition should be switched abruptly from the R-range to the L-range or D-range, it would never occur that the release of the backward movement brake device 26 is delayed and engagement of another first speed brake device 29 is effected while the brake device 26 is kept engaged resulting in overlapped operations of the both brake devices, and thereby locking of the rotary shaft can be surely prevented. When the spool 97 of the manual valve 48 is selectively positioned at the N-position, the hydraulic path 205 is communicated only with the hydraulic path 206 through the annular groove 315. The hydraulic path 206 is communicated with the annular groove 308 of the pressure regulating valve 47, so that said annular groove 308 is fed with the pressurized oil in the hydraulic path 205, and thereby the hydraulic pressure in the hydraulic path 205 is regulated, in the illustrated embodiment, at 5 kg/cm².

In the N-condition, the hydraulic pressure is also fed from the hydraulic path 206 through the hydraulic path 208 to the throttle valve 49. The throttle valve 49 comprises a cylindrical bore 279 drilled in the valve body 42, and in said bore 279 are accommodated two spools 93 and 94 and a spring 107 for urging the both spools 93 and 94 in the direction for separating them. In addition, in the aforementioned cylindrical bore 279 are opened hydraulic paths 208, 232, 233, 235 and 242 and oil exhaust ports 389 and 391, and further the throttle valve 49 is constructed so that the leftward or rightward movement of the spool 94 as viewed in FIG. 2 may be limited by a stopper 390.

One of the above-mentioned spools 94 serves to generate a hydraulic pressure correlated to a throttle valve opening angle of a carburettor provided for an engine (hereinafter called "throttle pressure" P), and the other spool 93 serves to detect a kick-down. At the right end of this spool 93 is provided a roller 108, and against this roller 108 abuts a lever not shown. This lever is gauged with the operation of the acceleration pedal, so that the amount of leftward displacement of the spool 93 is controlled in proportion to the throttle valve opening angle of the above-mentioned carburettor. Accordingly, to the spool 94 is applied an urging force proportional to the throttle valve opening angle by the spring 107.

The spool 94 is provided with lands 318, 320 and 322 and annular grooves 319, 321 and 323, and if a pressurized oil is fed to the annular groove 319, then the spool 94 is urged rightwardly due to the difference in the pressure-receiving area between the lands 318 and 320. Accordingly, the spool 94 stops at the position where the leftward urging force of the spring 107 and the rightward urging force caused by the above-described hydraulic pressure balance with each other. When the feed of the pressurized oil to the annular groove 319 is not effected, of course, the spool 94 is at the left end position, and in this case the hydraulic path 208 and the hydraulic path 232 are communicated via the annular groove 321. The hydraulic path 232 is communicated with the annular groove 319 via the hydraulic path 234 and 235, so that the pressurized oil fed to the hydraulic path 208 is also fed to the annular groove 319 to urge the spool 94 rightwardly, and when the pressurized oil in the annular groove 319 has reached a preset pressure, the communication between the hydraulic paths 208 and 232 is interrupted.

At this moment, if the hydraulic pressure within the annular groove 319 becomes transiently too high, then the spool 94 further moves rightwardly until the hydraulic path 232 and the oil exhaust port 389 are communicated via the annular groove 321, so that the pressurized oil in the hydraulic path 232 is exhausted, and thus the pressurized oil fed to the hydraulic paths 232, 234 and 235 and the annular groove 319 can be regulated at the throttle pressure $P_t$ having the characteristics as shown by a solid line A in FIG. 3. This throttle pressure $P_t$ is preset, in the illustrated embodiment, so as to be regulated in accordance with a throttle valve opening angle within the range of about 0 - 4 kg/cm$^2$. It is to be noted that the orifice 67 interposed in the hydraulic path 235 is provided for the purpose of preventing oscillation of the spool 94.

The pressurized oil in the hydraulic path 234 is fed to the hysteresis control valve 50 via a hydraulic path 256, and also it is fed to the first-second speed shift valve 51 via a hydraulic path 238, to the engine brake discrimination valve 54 via a hydraulic path 237, and to a second speed accumulator 55 via a hydraulic path 239. The hysteresis control valve 50 comprises a spool 92 slidably fitted in a cylindrical bore 280 drilled in a valve body 42, and a spring 109 for urging the spool 92 rightwardly as viewed in FIG. 2. On the spool 92 are formed lands 329, 331, 333 and 335 and annular grooves 330, 332 and 334, and in the cylindrical bore 280 are opened hydraulic paths 236, 245, 247, 248 and 260 and an oil exhaust port 269. The spool 92 is urged rightwardly by the spring 109, and also when pressurized oil is fed to the annular groove 330, the hydraulic pressure acts upon the pressure receiving surfaces of the lands 329 and 331, so that it is urged in the same direction as the urging direction of the spring 109 due to the difference in the pressure receiving area. Still further, when the pressurized oil is fed to the annular groove 334, the hydraulic pressure acts upon the pressure receiving surfaces of the lands 333 and 335, so that the spool 92 is urged in the opposite direction to the urging direction of the spring 109, that is, in the leftward direction as viewed in FIG. 2 due to the difference in the pressure receiving area.

The first-second speed shift valve 51 comprises a spool 90 slidably fitted in a cylindrical bore 281 drilled in the valve body 42 and a spring 115 for urging the same spool 90 rightwardly as viewed in FIG. 2. On the spool 90 are formed lands 363, 365, 367, 369, 371, 373 and 375 and annular grooves 362, 364, 366, 368, 370, 372 and 374, and in the cylindrical bore 281 are opened hydraulic paths 229, 238, 241, 211, 212, 246, 249, 252 and 253 and oil exhaust ports 254 and 255. The spool 90 is urged rightwardly as viewed in FIG. 2 by the spring 115, and when pressurized oil is fed to the annular grooves 362, 366, 368 or 372, the same hydraulic pressure acts upon the respective pressure receiving surfaces of the spool 90, so that the spool 90 is urged rightwardly as viewed in FIG. 2, whereas when the pressurized oil is fed to the annular groove 374, the spool 90 is urged leftwardly as viewed in FIG. 2.

The engine brake discrimination valve 54 comprises a spool 89 slidably fitted in a cylindrical bore 282 drilled in the valve body 42. On the spool 89 are formed lands 377, 379 and 381 and annular grooves 376, 378 and 380, and in the cylindrical bore 282 are opened hydraulic paths 237, 253, 212 and 256 and an oil exhaust port 257. When a hydraulic pressure is fed to the annular groove 376 at the left end, the spool 89 is urged rightwardly as viewed in FIG. 2, and when the hydraulic pressure is fed to the annular groove 380, the hydraulic pressure acts upon the pressure receiving surfaces of the lands 379 and 381, and due to the difference in the pressure receiving area the spool 89 is urged leftwardly.

The second speed accumulator 55 comprises a piston 88 slidably fitted in a cylindrical bore 283 drilled in the valve body 42 and consisting of a larger diameter section and a smaller diameter section, and a spring 114 for urging the piston upwardly as viewed in FIG. 2. The piston 88 is formed in a two-step structure so as to be fitted along the respective inner peripheral surfaces of the larger diameter section and the smaller diameter section of the cylindrical bore 283, and the upper side space of the piston 88 is divided into two chambers 215 and 240. When pressurized oil is fed to the chamber 215, it acts upon a pressure receiving surface 392 of the piston 88 to urge the piston 88 downwardly, and when the pressurized oil is fed to the chamber 240, it acts upon a pressure receiving surface 360 of the piston 88 to urge the piston 88 likewise downwardly, whereas when the pressurized oil is fed to a chamber 216 underside of the piston 88, the piston 88 is urged upwardly. The chamber 215 is communicated with a hydraulic path 214 via the orifice 75, the chamber 240 is communicated with a hydraulic path 239 via the orifice 74, and the chamber 216 is communicated with a hydraulic path 251 in which the orifice 73 and the check valve 72 are interposed as connected in parallel to each other.

When the spool 97 of the manual valve 48 is switched from the N-range to the D-range, the hydraulic path 205 is communicated with the hydraulic path 206 and 209 via the annular groove 315. The hydraulic path 209 is communicated with the governor valve 52 through a hydraulic path 210 in which the orifice 69 and an oil filter 33 are interposed, is communicated with the hydraulic path 252 opening in the cylindrical bore 281 of the first-second speed shift valve 51 through a hydraulic path 214, is communicated with the N-D control valve 58 via hydraulic paths 217 and 218, and is further communicated with hydraulic paths 220, 222 and 223 as branched from the hydraulic path 217 and through a flow rate limiter consisting of a parallel connection of the orifice 62 and the check valve 61 interposed therein. The hydraulic path 220 communicates with the N-D control valve 58, the hydraulic path 222 communicates with the N-D accumulator, and the hydraulic path 223 communicates with the first speed pressure regulating valve 57.

Explaining now the governor valve 52, this valve 52 is mounted on the above-described intermediate shaft 34, and comprises a spool 95 slidably fitted in a cylindrical bore 284 drilled radially in the intermediate shaft 34, a governor weight 96 slidably and coaxially fitted in a central bore of the spool 95, and a spring 116 compressed between a retainer 387 mounted at the inner end of a shaft portion 386 of the governor weight 96 by means of a snap ring 392 and the spool 95. In the cylindrical bore 284 are opened hydraulic paths 210 and 211 and an oil exhaust port 273. On the spool 95 are formed lands 382, 384 and 385 and an annular groove 383, the pressurized oil fed through the hydraulic path 210 is fed to the hydraulic path 211 via the annular groove 383 and also is exhausted from the oil exhaust port 273 through the gap spaces around the annular groove 383 and the land 384. The hydraulic pressure fed to the hydraulic path 211 is a hydraulic pressure correlated to a car speed having the characteristics as exemplified by solid line curves B and C in FIG. 4 (hereinafter called "governor pressure" $P_g$). This hydraulic pressure in the hydraulic path 211 is a pressure obtained through regulation by the balancing between the sum of the centrifugal force acting upon the governor weight 96 and the spool 95 directed upwardly as viewed in FIG. 2 and the resilient urging force of the spring 116, and the hydraulic urging force acting upon the spool 95 downwardly as viewed in FIG. 2, which is generated due to the difference in the pressure receiving area between the lands 382, 384 and 385 when the hydraulic pressure is fed to the annular groove 383. The governor pressure characteristic represented by the solid line curve B is obtained by the balancing between the downward urging force exerted upon the spool 95 by the hydraulic pressure and the upward centrifugal force exerted upon the governor weight 96 and the spool 95, under the state where the upper end of the spool 95 is urged against the governor weight 96 by the urging force of the spring 116, whereas the governor pressure characteristic represented by the solid line curve C is obtained by the balancing between the downward urging force exerted upon the spool 95 by the hydraulic pressure, the upward urging force exerted by the spring 116 and the upward centrifugal force exerted upon the spool 95 under the state where the retainer 387 is urged against the intermediate shaft 34 by the centrifugal force acting upon the governor weight 96. The hydraulic path 211 is communicated with a hydraulic path 212 through the annular groove 374 and the gap space around the land 375 of the first-second speed shift valve 51, and the hydraulic path 212 is communicated with the annular groove 380 of the engine brake discrimination valve 54.

Explaining now the first speed pressure regulating valve 57, this pressure regulating valve comprises a spool 91 slidably fitted in a cylindrical bore 285 drilled in the valve body 42, and a spring 112 for urging this spool 91 rightwardly as viewed in FIG. 2. On the spool 91 are formed lands 352 and 354 and annular grooves 350 and 353, a bore 286 being penetrated through the land 354 for communicating the annular groove 353 and a chamber 272 at the right end of the spool 91, and in the cylindrical bore 285 are opened hydraulic paths 223 and 224 and oil exhaust ports 270 and 271. On the spool 91 are exerted a rightward urging force by the spring 112, a leftward hydraulic force by the pressurized oil fed to the chamber 272 at the right end of the spool 91 and a rightward urging force applied by a lever 78 as described later, and depending upon these forces the hydraulic pressure of the pressurized oil fed from the hydraulic path 223 through the annular groove 353 to the hydraulic path 224 can be regulated. In addition, the pressurized oil fed to the hydraulic path 224 is supplied to the first-second speed timing valve 56 through the check valve 71 and a hydraulic path 225. The first-second speed timing valve 56 comprises a spool 87 slidably fitted in a cylindrical bore 287 drilled in a valve body 42 and a spring 113 for urging the spool 87 rightwardly as viewed in FIG. 2. On the spool 87 are formed lands 356 and 358 and annular grooves 355, 357 and 359, in the cylindrical bore 287 are opened hydraulic paths 225 and 262 and an oil exhaust port 263, and the right end of the cylindrical bore 287 is opened and communicated with a hydraulic path 249. Upon this spool 87 are exerted a rightward urging force by the spring 113 and a leftward hydraulic force acting upon the right end surface of the spool 87, and thereby switching for communicating or interrupting the passageway between the hydraulic path 225 and the hydraulic path 262 through the annular groove 357 is effected. When interrupted, the hydraulic path 262 is communicated with the oil exhaust port 263 via the annular groove 357, so that the oil in the hydraulic path 262 is exhausted to the oil pan 43.

The hydraulic path 262 is communicated through a hydraulic path 261 to a vacant space 288 within a cylinder 83 of a hydraulic servo device 77 for actuating the band brake device 29 for a first speed. This hydraulic servo device 77 comprises a piston 84 slidably fitted in the cylinder 83, a spring 85 for urging the piston 84 rightwardly as viewed in FIG. 2, and a push rod 80 threadedly secured to the center portion of the piston 84 approximately in a coaxial manner, the tip end of the push rod 80 being connected to one end of a brake band 79. Accordingly, when pressurized oil is fed to the vacant space 288, the piston 84 is urged leftwardly against a resilient force of the spring 85, so that the push rod 80 is also urged leftwards jointly with the piston 84, and thereby engages the brake band 79 with a drum 86 within which the clutch device 28 is accommodated to effect a braking action. In the illustrated embodiment, the hydraulic pressure with the vacant space 288 at the moment when the piston 84 is displaced leftwards against the resilient force of the spring 85 as described above and the brake band 79 makes initial engagement with the drum 86 while it is slipping, is preset at a low hydraulic pressure of about 0.5 kg/cm$^2$. While the feed of pressurized oil to the vacant space 288 is effected from the hydraulic path 209 opening in the cylindrical bore 278 of the manual valve 48 through the hydraulic paths 213, 217, orifice 62, hydraulic path 223, annular groove 353, hydraulic path 224, check valve 71, hydraulic path 225, annular groove 357 and hydraulic paths 262 and 261, the aforementioned feed of pressurized oil is effected gradually because of the fact that the orifice 62 is interposed in the midway, and although this hydraulic pressure within the vacant space 288 tends to rise abruptly just after the initial engagement, this steep rise of hydraulic pressure can be moderated by the N-D accumulator 59 as fully described in the following.

The N-D accumulator 59 comprises a hollow cylindrical major piston 101 slidably fitted in a cylindrical bore 289 drilled in the valve body 42, a minor piston 100 slidably and concentrically fitted in the hollow space of the major piston 101, and a spring 111 for urging the minor piston 100 rightwardly as viewed in FIG. 2, on the minor piston 100 are formed lands 342 and 344, and the right end of the land 342 abuts against a left end of an inner protrusion of the major piston 101. In addition, since the vacant space 221 within the cylindrical bore 289 is communicated with the hydraulic path 223 via a hydraulic path 222, a hydraulic pressure equal to the hydraulic pressure within the vacant space 288 of the hydraulic servo device 77 acts upon a pressure receiving surface 291 of the major piston 101 and a pressure receiving surface 292 of the minor piston 100.

In the above-described N-D accumulator 59, when the hydraulic pressure in the vacant space 221 has reached 0.8 kg/cm$^2$, the both pistons 100 and 101 begin to move leftwards against the resilient force of the spring 111, but when the same hydraulic pressure has grown to 3 kg/cm$^2$, the left end of the major piston 101 abuts against the valve body 42 and stops there, and further when the above-referred hydraulic pressure has become 7.2 kg/cm², only the minor piston 100 begins to move further leftwards against the resilient force of the spring 111 and this piston 100 also abuts against the valve body 42 and stops there. The hydraulic pressure within the vacant space 221 upon this stoppage is preset, in the illustrated embodiment, at 8 kg/cm². Accordingly, the characteristics of the accumulator pressure generated by the N-D accumulator are as shown in FIG. 5.

On the other hand, since the vacant space 288 of the hydraulic device for the first speed band brake is also communicated with the annular groove 302 of the pressure regulating valve 47 through the hydraulic paths 261 and 258, at the same time when the hydraulic pressure is fed to the vacant space 288, it is also fed to the annular groove 302, so that the line pressure in the hydraulic path 205 is raised, and is regulated, at the highest, at 8 kg/cm².

The other end of the brake band 79 in the band brake device 29 is connected to one end of a lever 78 via a strut 81, and the opposite end of the lever 78 that is rotatable about a pin 400 is opposed to an end surface of the spool 91 of the first speed pressure regulating valve 57.

When the manual valve 48 has been switched from the N-range to the D-range, pressurized oil is fed to the hydraulic path 209, then the first speed pressure regulating valve 57 is positioned at the rightmost position due to the urging force of the spring 112 so that the hydraulic path 223 is communicated with the hydraulic path 224 through the annular groove 353, and the first-second speed timing valve 56 is also positioned at the right end due to the urging force of the spring 113 so that the hydraulic paths 225 and 262 are communicated with each other through the annular groove 357, and consequently, the pressurized oil in the hydraulic path 209 is fed to the vacant space 288 of the hydraulic servo device 77, so that the engagement of the brake band 79 commences.

At this moment, the drum 86 is rotating in the direction of arrow D, and when the brake band 79 makes initial engagement while slipping, in addition to the urging force of the push rod 80, a torque generated by the friction between the brake band 79 and the drum 86 and determined in accordance with said urging force, act upon the strut 81 as a force directed in the direction shown by arrow F in FIG. 2, this actuating force being transmitted to the lever 78, and this lever 78 rotates in the direction shown by arrow G in FIG. 2 until it abuts against the spool 91 of the first speed pressure regulating valve 57 and urges the spool 91 rightwardly. Accordingly, the spool 91 is subjected to the urging force by the lever 78 and the resilient force of the spring 112 both rightwardly, and to a hydraulic force leftwardly urging the right end surface of the spool 91 that is generated by the pressurized oil fed from the hydraulic path 224 through the annular groove 353 and the penetrating bore 286 to the vacant space 272, and consequently, the pressurized oil fed from the hydraulic path 223 to the hydraulic path 224 would be regulated to a hydraulic pressure proportional to the urging force generated by said lever 78. Since this hydraulic pressure in the hydraulic path 224 is simultaneously fed to the vacant space 288, in case that the drum 86 is rotating in the direction represented by arrow D, the urging force of the push rod 80 is increased and in response thereto the aforementioned braking torque is also increased, so that the hydraulic pressure in the hydraulic path 224 is increased abruptly. In this case, though the shock occurring upon switching to the D-range comes into question, if trampling of an acceleration pedal is not effected or the amount of trampling is so small that the rotational speed of the engine is low upon the selective switching from the N-range to the D-range, then the time required for stopping the drum 86 is so short that the drum 86 is stopped before the hydraulic pressure generated in the hydraulic path 224 and fed to the vacant space 288 is grown high, and so, the engagement of the first speed band brake device 29 is completed in the first pressure regulating stage of the N-D accumulator, whereby the rise of the hydraulic pressure fed to the hydraulic servo device 77 can be suppressed within 3 kg/cm² and thus the shock can be moderated. On the other hand, if the amount of trampling of the acceleration pedal is so large that the rotational speed of the engine is as high as 6000 rpm, then since the rotational speed of the drum 86 is also high in accordance thereto, the first speed band brake device 29 has not been engaged completely even at the stage where the hydraulic pressure fed to the hydraulic servo device 77 has been grown up to 3 kg/cm², so that the line pressure $P_l$ regulated by the pressure regulating valve 47 rises abruptly up to 8 kg/cm² due to the high torque generated by the brake band 79. As this pressure rise is steep, unless any provision is made, the spool 98 of the pressure regulating valve 47 makes overstroke rightwardly, so that the oil exhaust path 259 or 203 for the pressurized oil in the hydraulic path 205 is closed, and thereby the line pressure $P_l$ becomes momentarily high. Consequently, the torque exerted upon the drum 86 is increased abruptly, and so, there is a fear that a disadvantage may occur in that an excessive force is exerted upon the shaft on the output side and thus upon the sleeve shaft 18 (FIG. 1), resulting in breakdown of the same. However, in such a case, the second stage of operation of the above-described N-D accumulator is effected, and thereby the aforementioned disadvantage can be eliminated.

If the N-D accumulator 59 and the orifice 62 are always operable, there occurs a disadvantage in that upon changing a speed from the second speed to the first speed the engagement of the first speed band brake device 29 is delayed, but in the illustrated embodiment, by providing the N-D control valve 58 the above-mentioned disadvantage can be eliminated. More particularly, the N-D control valve 58 comprises a spool 99 slidably fitted in a cylindrical bore 293 drilled in the valve body 42, and a spring 110 for urging the same spool 99 rightwardly as viewed in FIG. 2. On the spool 99 are formed lands 337 and 339 and annular grooves 336, 338 and 340, and in the cylindrical bore 293 are opened one ends of the hydraulic paths 218 and 220, opposite ends of a hydraulic path 219 and an oil exhaust port 395. When the feed of the pressurized oil to the hydraulic path 220 is interrupted, the spool 99 is positioned at the right end due to the urging force of the spring 110, and only the hydraulic path 220 is communicated with the annular groove 338. However, if the hydraulic pressure fed from the hydraulic path 220 to the annular groove 338 exceeds 4 kg/cm², then the spool 99 is displaced leftwards against the resilient force of the spring 110 due to the difference in the pressure receiving area between the lands 337 and 339. Consequently, the interrupted hydraulic paths 218 and 220 are communicated through the annular groove 340, the hydraulic path 219 and the annular groove 338, and subsequently, the spool 99 is fixedly held at the illustrated left end position by the combined force of the hydraulic force generated due to the difference in the pressure receiving surface area between the lands 337 and 339 and the hydraulic force exerted upon the right end surface of the spool 99, this fixed condition being maintained until the hydraulic pressure in the hydraulic path 220 is lowered approximately below 1 kg/cm². Accordingly, upon speed change of 1st speed⇌2nd speed, the pressurized oil fed from the manual valve 48 to the hydraulic path 209 would be fed to the hydraulic path 220 through the hydraulic path 217 and 218, the annular groove 340, the hydraulic path 219 and the annular groove 338 without passing through the orifice 62. In addition, once the first speed condition or second speed condition has been established, the hydraulic path 220 is always fed with the line pressure $P_l$ that is regulated by the regulating valve 47, so that the hydraulic pressure in the hydraulic path 220 is scarcely lowered below 5 kg/cm², and under such conditions the first stage operation of the N-D accumulator 59 would not be effected. The check valve 61 is provided for the purpose of quickly exhausting the oil in the chamber 221 of the N-D accumulator 59 when the manual valve 48 has been switched from the D-range to the N-range, and at that time, since the oil in the chamber 221 is exhausted through the hydraulic path 222, the check valve 61, the hydraulic paths 217 and 209 and the manual valve 48, the first speed band brake device 29 can be simultaneously released.

Now explanation will be made on the automatic speed change from the first speed to the second speed in the D-range. In the D-range, pressurized oil is fed from the hydraulic path 209 through the hydraulic paths 213, 214 and 252 to the first-second speed shift valve 51. However, in the first speed condition where the force urging the spool 90 leftwardly generated by the governor pressure $P_g$ fed from the governor valve 52 through the hydraulic path 211 to the annular groove 374 of the first-second speed shift valve 51, is smaller than the composite force consisting of a force generated by the throttle pressure $P_t$ fed from the throttle valve 49 through the hydraulic paths 232, 234 and 238 to the annular groove 366 of the first-second shift valve 51 and a force for urging the spool 90 rightwardly generated by the spring 115, the spool 90 is stopped at the right end position, and at that time, the hydraulic path 252 is interrupted by the land 369 of the spool 90. However, if the above-referred throttle pressure $P_t$ is lowered or the above-referred governor pressure $P_g$ is increased and thereby the spool 90 is displaced to the left end position as illustrated in FIG. 2, then the hydraulic path 252 is communicated with the hydraulic path 249 via the annular groove 370, so that the pressurized oil is fed from the hydraulic path 252 through the hydraulic paths 249 and 250 to a hydraulic servo device not shown for the second speed clutch device 28, and also it is fed through the hydraulic path 251, the orifice 73 and the check valve 72 to the chamber 216 of the second speed accumulator 55.

At this time, though the pressurized oil is fed to the hydraulic servo device for the second speed clutch device 28 at first slowly due to the existence of the orifice 70 in the hydraulic path 252 and the hydraulic pressure is kept low until the gap space between a friction plate and a pressure plate not shown of the clutch device 28 is narrowed to zero, when the engagement of the clutch device 28 has commenced, the hydraulic pressure in the hydraulic path 249 begins to rise. When the hydraulic pressure within the hydraulic path 249 has reached a given pressure between 2.5 kg/cm² and 4 kg/cm², the accumulator 55 starts operation, so that the hydraulic pressure within the hydraulic path 249, that is, the hydraulic pressure fed to the hydraulic servo device for the second speed clutch device 28 is regulated substantially at a constant pressure until the piston 88 abuts against the top end of the cylindrical bore 283 and stops operation, and when the operation of the accumulator 55 has stopped, the hydraulic pressure rises abruptly up to the line pressure $P_l$ of 5 kg/cm². With regard to the pressure regulating function of the accumulator 55, the hydraulic pressure within the chamber 216 is regulated by the balancing between the composite force consisting of the force generated by the line pressure $P_l$ exerted upon the pressure receiving surface 392 of the piston 88 and the force generated by the throttle pressure $P_t$ exerted upon the pressure receiving surface 360, and the composite force consisting of the hydraulic force exerted upon the lower surface of the piston 88 by the pressurized oil fed to the chamber 216 and the resilient force of the spring 114. Since the line pressure $P_l$ is regulated substantially at a constant pressure, the pressure regulated by the accumulator 55 is proportional to the throttle pressure $P_t$, and the accumulator 55 is preset so that this hydraulic pressure may be regulated at 2.5 kg/cm² when the throttle valve opening angle of the carburettor is an idling angle, and at 4 kg/cm² when the throttle valve is fully opened.

As the second speed clutch device 28 gradually increases its engaging force with the above-described regulated pressure, the torque shared by the same apparatus 28 is increased, whereas the torque in the direction shown by arrow D shared by the first speed band brake device 29 is gradually decreased, until the shared torque is eventually reduced to zero. If the torque shared by the first speed band brake device 29 is reduced, owing to the action of the first speed pressure regulating valve 57, the hydraulic pressure fed to the chamber 288 of the hydraulic servo device 77 is also reduced in proportion to the decrease of the shared torque, resulting in lowering of the engaging force, so that when the drum 86 tends to rotate in the anti-clockwise direction as represented by dash-line arrow E in FIG. 2, the brake device presents only a very small resistive force. Accordingly, by means of such devices, a function similar to that of a one-way clutch is realized and the speed change can be effected smoothly.

Though the hydraulic pressure fed to the hydraulic servo device 77 by the first speed pressure regulating valve 57 is regulated to 1 kg/cm² when the drum 29 is rotating in the anti-clockwise direction, this hydraulic pressure can be reduced to zero by applying a hydraulic pressure higher than 4 kg/cm² to the right end of the spool 87 of the first-second timing valve 56 and thereby displacing the timing valve 56 to the illustrated left end position where the hydraulic path 262 and the oil exhaust port 263 are communicated with each other to exhaust the oil, and thus generation of friction due to slipping of the brake band 79 can be prevented.

Now the automatic speed change from the second speed to the first speed in the D-range will be described. When the first-second speed shift valve 51 is again restored to the right end position due to the fact that the car speed is lowered and thus the governor pressure $P_g$ is reduced or that the so-called kick-down is effected to enhance the trampling of the acceleration pedal and thus the throttle pressure $P_t$ is increased, the communication between the hydraulic paths 249 and 252 is interrupted and the hydraulic path 249 is communicated with the oil exhaust port 255, so that the oil fed to the hydraulic servo device for the second speed clutch device 28 begins to be exhausted. When the hydraulic pressure of the same servo device has been lowered below 4 kg/cm², the first-second speed timing valve 56 is displaced to the right end by the resilient force of the spring 113, so that the hydraulic paths 225 and 262 are communicated with each other to feed the pressurized oil regulated by the first speed pressure regulating valve 57 at 1 kg/cm² from the hydraulic path 223 to the chamber 288 of the hydraulic servo device 77, and therefore, light initial engagement is effected in the band brake device 29. Here it is to be noted that upon this engagement, the drum 86 is rotating in the anti-clockwise direction and the hydraulic pressure in the first speed pressure regulating valve 57 is kept regulated at 1 kg/cm². Therefore, when the rotation of the drum 86 has stopped and begins to rotate reversely in the direction of arrow D, the torque shared by the band brake device 29 is gradually increased, and in response thereto the pressure regulated by the first speed pressure regulating valve 57 is also increased, resulting in increase of the fastening force of the brake band 79, so that smooth speed change can be completed without generating a speed change shock. It is to be noted that the exhaust of the pressurized oil in the chamber 216 of the second speed accumulator 55 is effected slowly through the orifice 73 because the check valve 72 is closed, and thereby delay of the release of the second speed clutch device 28 can be prevented.

In this connection, the above-mentioned speed changes of 1st speed → 2nd speed and 2nd speed → 1st speed are made to have hysteresis as shown by the shift pattern in FIG. 6, and this hysteresis control is effected by means of the specially provided hysteresis control valve 50. More particularly, in the illustrated embodiment, because the device is a speed change gear having two forward movement stages, it is necessary in practice to make the device have special hysteresis, so that in comparison to the heretofore known shift pattern the hysteresis is preset rather small in the kick-down zone where the throttle valve opening is 85.7%-100%.

In this connection, with reference to FIG. 6, solid line curves L and N represent speed change characteristic curves from the first speed to the second speed, while broken line curves M and Q represent speed change characteristic curves from the second speed to the first speed. The car speed at the throttle valve opening of 100% on the solid line N is preset in view of over-run of an engine, while the same on the broken line Q is preset in view of security for sufficient accelerating performance, and the more the broken line Q is displaced to the low speed side, the more the acceleration effect caused by kick-down is reduced, resulting in a disadvantage that sufficient accelerating performance cannot be obtained upon passing at a high speed. On the other hand, under a partially loaded condition where the throttle valve opening is about 50-60%, if speed change is repeated frequently, a disadvantage would occur in that maneuverability is degraded.

To the hysteresis control valve 50 is fed pressurized oil from a hydraulic path 260, so that the pressurized oil in the hydraulic path 260 is fed to a hydraulic path 247 through the annular groove 332 as pressure-regulated, and the characteristic of this regulated hydraulic pressure (hereinafter called "modulator pressure" $P_m$) is proportional to the throttle pressure $P_t$ fed to the annular groove 330 of the spool 92 from the hydraulic path 236 as represented by solid lines R and S in FIG. 7. Here it is to be noted that the reason why the modulator pressure $P_m$ is lowered at the throttle valve opening of 85.7%-100% as shown by a solid line S in FIG. 7, is because of the operation in response to detection of kick-down by the throttle valve 49. When the acceleration pedal has been trampled largely, the spool 93 is displaced largely leftwards as viewed in FIG. 2, the hydraulic path 242 which has been communicated with the oil exhaust port 391, is communicated with the hydraulic path 233 via the annular groove 326, so that pressurized oil is fed to the annular groove 241 of the first-second speed shift valve 51 through the hydraulic paths 232, 234 and 233, annular groove 326 and hydraulic paths 242 and 241, and the speed change characteristic curve is largely displaced to the higher speed side in the region of the throttle valve opening of 85.7%-100%, and thereby the kick-down zone can be established. In addition, the pressurized oil is also fed to the annular groove 334 of the hysteresis control valve 50 via the hydraulic path 245, and since this hydraulic pressure acts against the throttle pressure $P_t$ introduced into the aforementioned annular groove 330, the modulator pressure $P_m$ is lowered. The above-referred modulator pressure $P_m$ is fed from the hydraulic path 247 through the hydraulic path 246 to the first-second speed shift valve 51. When the spool 90 is positioned at the right end, the pressurized oil is fed to the annular groove 372 and urges the spool 90 rightwards due to the difference in the pressure receiving area. On the other hand, when the spool 90 is positioned at the left end as shown in FIG. 2, the communication between the annular groove 372 and the hydraulic path 246 is interrupted by the land 373 and the annular groove 372 is communicated with the oil exhausting port 255, so that the pressurized oil in the annular groove 372 is exhausted. Therefore, upon speed change from the first speed to the second speed when the spool 90 is displaced from the right end position to the illustrated left end position, the urging force generated by the modulator pressure $P_m$ acts upon the spool 90, so that the displacement of the spool 90 is effected under the condition of the correspondingly higher governor pressure $P_g$ which exerts a leftward urging force upon the spool 90, whereas upon speed change from the second speed to the first speed when the spool 90 is displaced from the left end position to the right end position, the modulator pressure $P_m$ does not act upon the spool 90, so that the displacement of the spool 90 is effected under the condition of the correspondingly lower governor pressure $P_g$ than that in the case of the above-described acceleration from the first speed to the second speed, and thus the so-called snap action is exerted, resulting in the hysteresis as illustrated in FIG. 6 and described above.

When the manual valve 48 is operated to select the L-range, pressurized oil is fed also to the hydraulic path 229 which has been interrupted from feeding of pressurized oil at the D-range, and the pressurized oil is led to the annular groove 362 in the first-second speed shift valve 51. Since this pressurized oil is at the line pressure $P_l$, the spool 90 is locked at the right end position, and further this pressurized oil is fed to the engine brake discrimination valve 54 through the hydraulic path 253. At this moment, under an engine brake condition represented as driving conditions underside of the single dot chain line W in FIG. 6 where the throttle pressure $P_t$ is low but the governor pressure $P_g$ is high, the spool 89 of the engine brake discrimination valve 54 is at the left end position and the hydraulic path 253 is communicated with the hydraulic path 256 through the annular groove 378, so that the pressurized oil in the hydraulic path 253 is fed to the chamber 288 of the hydraulic servo device 77 through the annular groove 378, hydraulic path 256, check valve 71, hydraulic path 225, annular groove 357 and hydraulic paths 262 and 261, and this hydraulic pressure being fed is equal to the line pressure $P_l$ because it is not passed through the first speed pressure regulating valve 47. Since this line pressure $P_l$ is fed to the annular groove 302 of the pressure regulating valve 47 through the hydraulic path 258, said line pressure $P_l$ is kept at 8 kg/cm$^2$, so that the line pressure $P_l$ of 8 kg/cm$^2$ is fed to the hydraulic servo device 77 regardless of the direction of rotation of the brake drum 86 to always achieve slipless engagement of the first speed band brake device 29, and thus engine brake can operate. Whereas, under an engine drive condition represented as driving conditions upperside of the single dot chain line W in FIG. 6 where the throttle pressure $P_t$ is high but the governor pressure $P_g$ is low, the spool 89 of the engine brake discrimination valve 54 is positioned at the right end as shown in FIG. 2 and the communication between the hydraulic paths 253 and 256 is interrupted while the hydraulic path 256 is communicated with the oil exhaust port 257, so that a hydraulic control circuit exactly the same as the control circuit under the above-described first speed condition at the D-range can be established, and therefore, under the driving conditions upperside of said single dot chain line W, the engine brake cannot operate and the rotation of the drum 86 in the direction of arrow E is allowed.

As will be obvious from the above description, according to the illustrated embodiment of the present invention, in a hydraulic type automatic transmission provided with a hydraulic torque converter 13 and a plurality of friction-engagement devices 26, 28 and 29 associated with hydraulic servo devices; the friction-engagement device for realizing a first forward speed consists of a band brake device 29, which is constructed in such manner that a hydraulic pressure adapted to a reaction torque generated upon frictional fixing of the device 29 is fed to a hydraulic servo device 77 for engaging said band brake device 29 under control of a first speed pressure regulating valve 57, so that when the torque borne by said band brake device 29 is directed in the direction of arrow D the hydraulic pressure being fed may be increased to complete the fixing as the torque is increased, whereas when it is directed in the direction of arrow E only such a low hydraulic pressure that the fixing is made impossible can be fed; a parallel connection of a flow rate limiter and an N-D control valve 58 serving as a gate valve is interposed in the midway of hydraulic paths 217 and 223 for feeding pressurized oil (at a line pressure $P_l$) regulated by a hydraulic pressure regulating valve 47 from an oil pump 30 through said first speed pressure regulating valve 57 to the hydraulic servo device 77 for said band brake device 29, said flow rate limiter consisting of a parallel connection of an orifice 62 and a check valve for allowing communication only in the direction from said hydraulic servo device 77 to the oil pump 30, said N-D control valve 58 is opened to communicate hydraulic paths 218, 219 and 220 for by-passing said flow rate limiter 61 and 62 when the hydraulic pressure fed to said hydraulic servo device 77 exceeds a preset value; and an N-D accumulator 59 is provided in the hydraulic paths 220 and 223 between said flow rate limiter 61, 62, said N-D control valve 58 and said first speed pressure regulating valve 57, said accumulator 59 is constructed so as to perform a first stage of operation at least when the pressurized oil fed to said first speed pressure regulating valve 57 is at a low hydraulic pressure of 0.8 kg/cm$^2$–3 kg/cm$^2$ and to perform a second stage of operation when said pressurized oil has taken a pressure of 7.2 kg/cm$^2$ that is just before it takes the highest regulated pressure 8 kg/cm$^2$ to be fed to said first speed pressure regulating valve 57, and therefore, even if a hydraulic pressure is fed to the hydraulic servo device 77 for realizing engagement of the first speed band brake device 29 starting from a neutral condition, the rise of the hydraulic pressure caused by this feed of pressurized oil is effected gradually owing to the hydraulic resistance of the orifice 62 and the operation of the N-D accumulator 59, or even in case that an acceleration pedal is trampled under the above-mentioned neutral condition resulting in a higher rotational speed of the engine, the hydraulic pressure fed to the hydraulic servo device 77 would not rise momentarily up to a high hydraulic pressure exceeding a preset pressure owing to the two-stage operations of said N-D accumulator 59, whereby the first speed driving can be achieved smoothly starting from the neutral condition.

Still further, according to the above-described construction, since pressurized oil can be fed to the first speed pressure regulating valve 57 without hydraulic resistance through the by-paths 218, 219 and 220 opened by the actuation of the N-D control valve 58 without passing through the flow rate limiter 61 and 62 upon speed changes between the first and second speeds in the D-range, the preferably one-way clutch action of the first speed band brake device 29 would not be disturbed by the operations of the orifice 62 and the accumulator 59.

While the N-D accumulator 59 has a structure adapted for two-stage operations in the above-described embodiment, of course, it could have a structure adapted for multi-stage operations of three or more stages, and it could have a structure adapted for continuous operations from a low hydraulic pressure up to the highest regulated pressure.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A speed change gear in a hydraulic type automatic transmission including a fluid torque converter and a plurality of friction-engagement devices associated with hydraulic servo devices, in which different speed change ratios including a plurality of forward movement steps can be realized by selectively actuating said friction-engagement devices with a hydraulic pressure either automatically or manually; characterized in that said speed change gear comprises a first friction-engagement device for realizing a predetermined gear ratio, a second friction-engagement device for realizing a higher speed gear ratio than said predetermined gear ratio, a hydraulic pressure source, a hydraulic pressure regulating valve for controlling a line pressure generated by said hydraulic pressure source, a first hydraulic servo device for engaging said first friction-engagement device, a second hydraulic servo device for engaging said second friction-engagement device, a first hydraulic path for feeding a hydraulic pressure regulated by said hydraulic pressure regulating valve to said first hydraulic servo device, a second hydraulic path for feeding said regulated hydraulic pressure to said second hydraulic servo device, a switching valve interposed in the midway of said first and second hydraulic paths for selectively switching the hydraulic pressure feed to said first and second hydraulic servo devices, a control valve disposed in the midway of said first and second hydraulic paths for controlling switching between the state of feeding a hydraulic pressure to said respective hydraulic paths and the state of exhausting pressurized oil fed to the respective hydraulic paths, a flow rate limiter and a gate valve interposed in parallel in the midway of said first hydraulic path between said switching valve and said control valve, and an accumulator disposed in said first hydraulic path between said switching valve and said flow rate limiter and gate valve, said gate valve being adapted to be opened to communicate a hydraulic path for by-passing said flow rate limiter when the hydraulic pressure fed to said first hydraulic servo device exceeds a predetermined value.

2. A speed change gear in a hydraulic type automatic transmission as claimed in claim 1, further characterized in that said predetermined gear ratio is a gear ratio for attaining a first forward speed, said higher speed gear ratio than said predetermined gear ratio is a gear ratio for attaining a second forward speed, and said speed change gear is brought into a neutral condition when the pressurized oil fed to the respective hydraulic paths is exhausted by the control valve.

3. A speed change gear in a hydraulic type automatic transmission as claimed in claim 1, further characterized in that said predetermined gear ratio is a gear ratio for attaining a certain speed change step equal to or higher than a second forward speed, there are additionally provided a third friction-engagement device for realizing a lower speed gear ratio than said predetermined gear ratio, a third hydraulic servo device for engaging said third friction-engagement device, and a third hydraulic path for feeding a hydraulic pressure to said third hydraulic servo device, and said lower speed gear ratio can be realized when the pressurized oil fed to said first and second hydraulic paths is exhausted by the control valve and a hydraulic pressure is fed to said third hydraulic path.

4. A speed change gear in a hydraulic type automatic transmission as claimed in claim 1, further characterized in that said first friction-engagement device consists of a band brake device, and said band brake device is constructed in such manner that a hydraulic pressure adapted to a reaction torque generated upon frictional fixing of said band brake device is fed to said first hydraulic servo device under control of a pressure regulating valve interposed in said first hydraulic path, and thereby a hydraulic pressure being fed is enhanced as said reaction torque borne by said band brake device is increased in one direction until the frictional fixing is completed, while in the opposite direction only such degree of low hydraulic pressure as making the frictional fixing impossible can be fed.

5. A speed change gear in a hydraulic type automatic transmission as claimed in claim 1, further characterized in that actuation of said accumulator is effected at least in the period of a low hydraulic pressure and immediately before the highest regulated pressure is attained.

6. A speed change gear in a hydraulic type automatic transmission as claimed in claim 1, further characterized in that said flow rate limiter consists of an orifice and a check valve, which permits communication only in the direction directed from said hydraulic servo device to said hydraulic pressure source, disposed in parallel to each other.

* * * * *